Aug. 27, 1957     E. W. LENZ ET AL     2,804,297
POWER UNIT AND WINDOW SYSTEM INCORPORATING THE SAME
Filed Oct. 17, 1952     4 Sheets-Sheet 1

INVENTORS
EMORY W. LENZ and
WILLIAM C. RIESTER
BY
Beau, Brooks, Buckley & Beau.
ATTORNEYS.

Aug. 27, 1957  E. W. LENZ ET AL  2,804,297
POWER UNIT AND WINDOW SYSTEM INCORPORATING THE SAME
Filed Oct. 17, 1952  4 Sheets-Sheet 3

INVENTORS
EMORY W. LENZ and
WILLIAM C. RIESTER
BY
Beau, Brooks, Buckley & Beau.
ATTORNEYS.

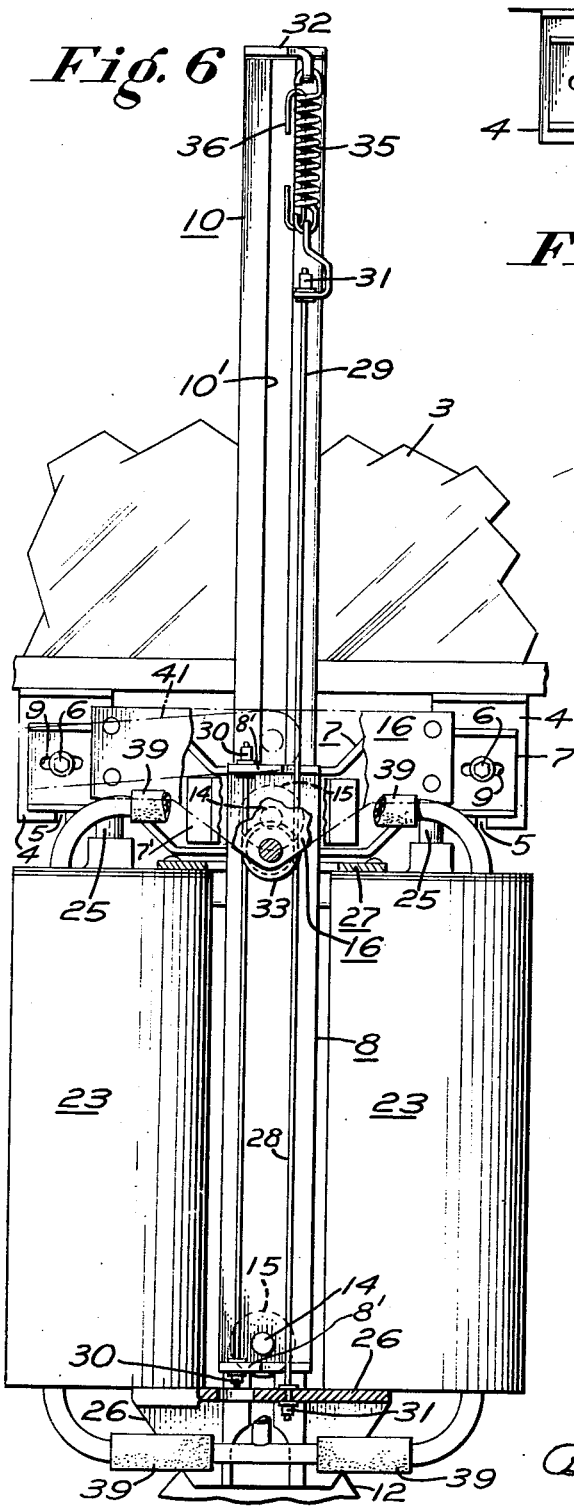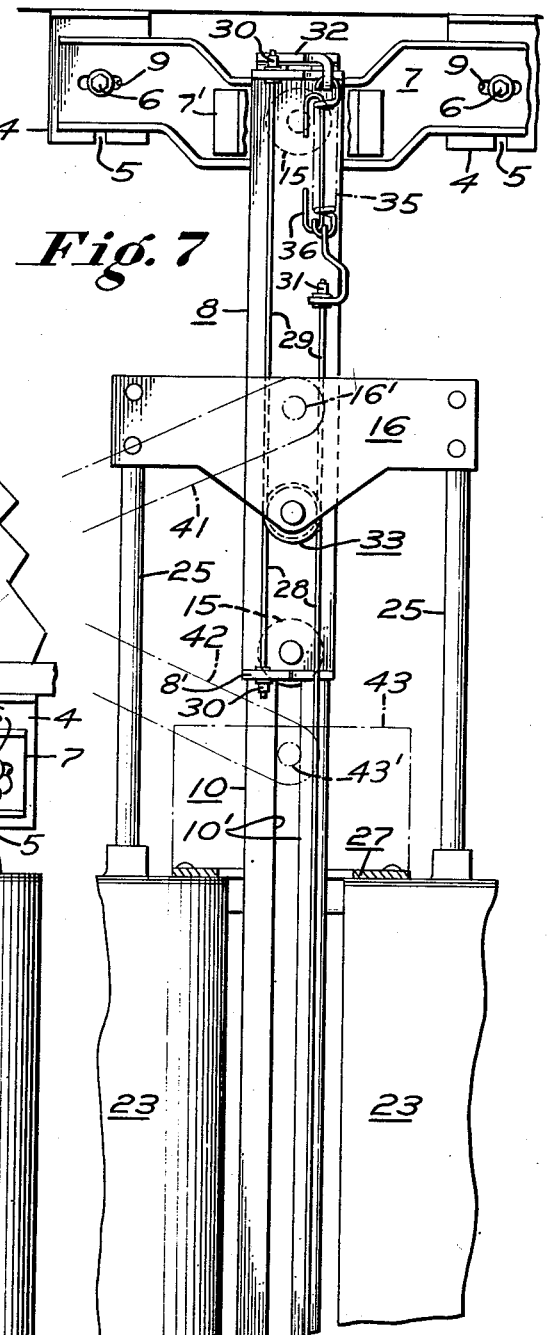

United States Patent Office 2,804,297
Patented Aug. 27, 1957

2,804,297

POWER UNIT AND WINDOW SYSTEM INCORPORATING THE SAME

Emory W. Lenz, Buffalo, and William C. Riester, Eggertsville, N. Y., assignors to Trico Products Corporation, Buffalo, N. Y.

Application October 17, 1952, Serial No. 315,396

4 Claims. (Cl. 268—125)

This invention relates to the power transmission art and more particularly to an arrangement by which a back and forth motion is transmitted through a motion modifying gearing to perform the intended function. The invention has a wide range of usages but is admirably adapted to the automotive field for the opening and closing of windows and doors of motor vehicles where compactness, sturdiness and ease of installation are desirable.

An important object of this invention is to provide a power transmission of simple and practical design by which a reciprocatory member may be operated with an ease of motion and by a minimum amount of applied power.

Another object of the invention is to provide a power transmission for imparting a translatory motion to a driven member through a motion modifying action that will give the desired motion advantage through a pulley and cable arrangement and afford a degree of flexibility to adapt it for its intended use with a satisfactory performance.

In its adaptation to the present day automobile for opening and closing its windows, which latter term is used inclusive of doors and like closures, the present invention fulfills a long felt need. It has heretofore been proposed to operate a window of an automobile by a power mechanism arranged within the wall or door compartment thereof which latter of necessity is of limited width and therefore requires any mechanism so employed to be compact. Prior operating mechanisms have been powered electrically, hydraulically, and pneumatically, utilize motion-extending transmissions of various designs which are bulky and expensive to install, while others are cumbersome and require heavier power units than the wall compartment will accommodate. The trend in car building has included wider seats which have caused further narrowing of the window wells in car doors, making it more difficult to install window lifting power units.

The present invention provides a practical operator unit which is compact and especially suited for installation in the space between the panel and the door of the vehicle. By reason of its construction it combines with the window to form an integral and vital part of a window system and, therefore, it is a further object of the invention to provide a window system for motor vehicles which is dependable and capable of applying the window moving force in a manner to provide fast, silent and dependable operation.

The invention further resides in a window operator having a movement amplifying transmission of a flexible character serving to impart an accelerated movement to the window and capable of adjusting itself to the guided movement of the window.

A still further object of the invention is to provide a closure operator which may be readily installed as a unit in a vehicle.

The foregoing and other objects will manifest themselves as this description progresses, reference being made therein to the accompanying drawings wherein:

Fig. 6 is a view about on line VI—VI of Fig. 4, similar to Fig. 2 but from the opposite side of the operator, and having parts broken away for clarity; and Fig. 7 is a similar view, in fragment, but showing the mechanism extended.

Figure 1:
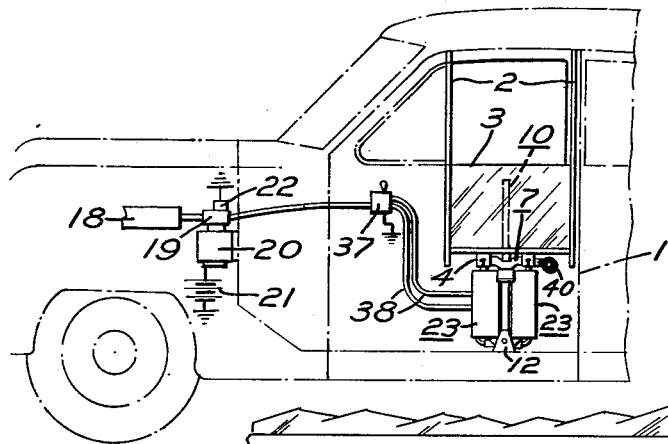
Fig. 1 is a diagrammatic view depicting the improved power transmission as an operator for a window of an automobile.
Figure 2:
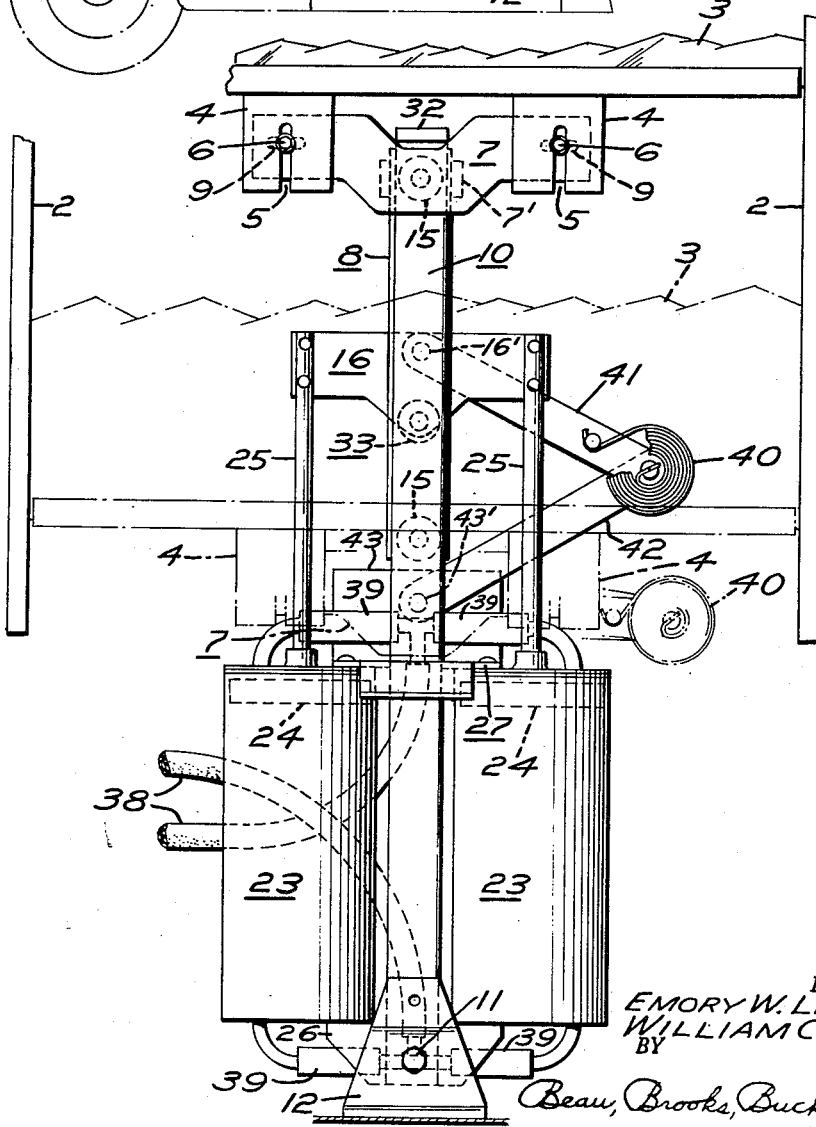
Fig. 2 is a view in side elevation of the closure operator.
Figure 3:
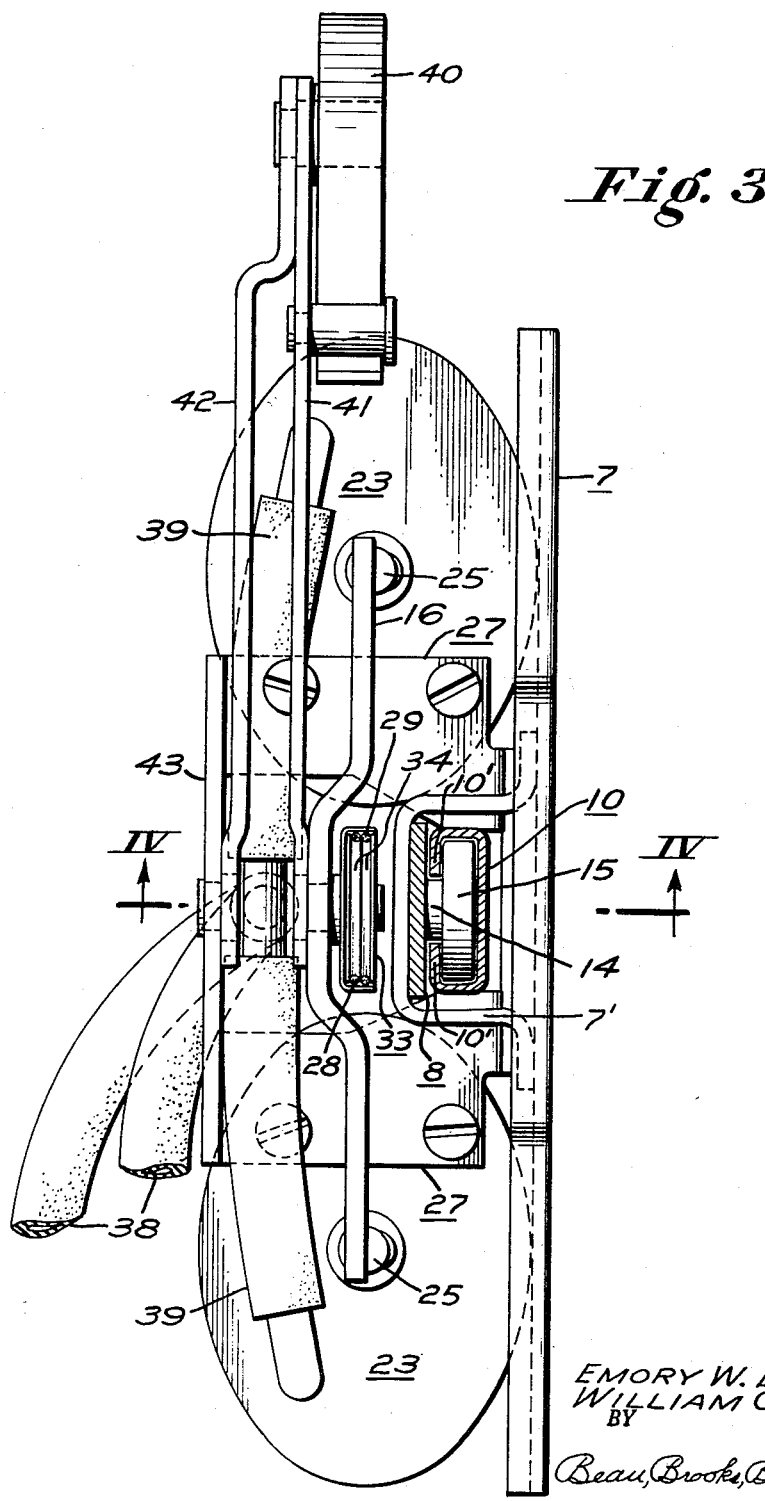
Fig. 3 is a plan view of the power transmission unit, with parts in section.
Figure 4:
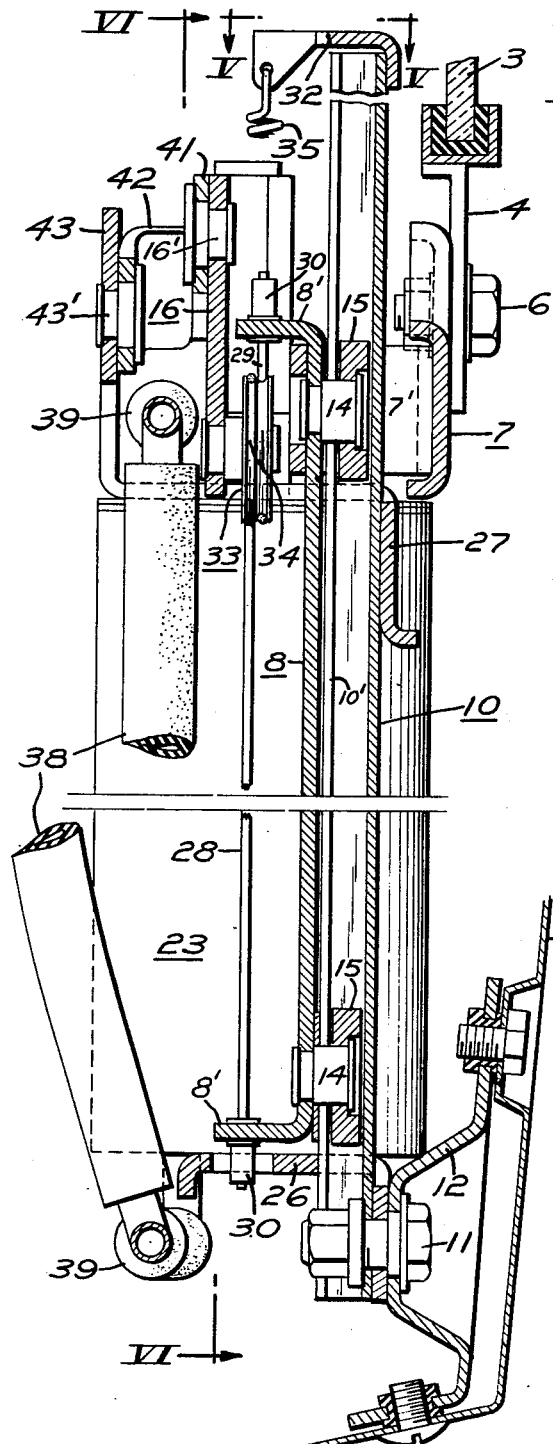
Fig. 4 is a vertical sectional view through the closure operator as seen about on line IV—IV of Fig. 3.
Figure 5:
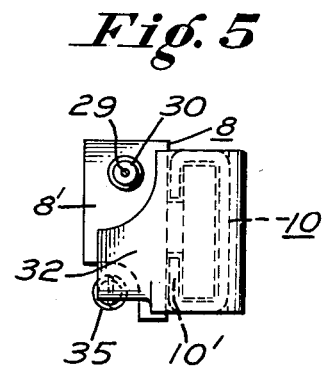
Fig. 5 is a detailed plan view looking down upon the unit from the plane of line V—V of Fig. 4.

The present invention embodies a motion amplifying transmission which is readily adaptable for general utility wherever a compact unit is desired while securing a maximum amount of movement. The transmission unit is capable of a simple installation in the wall compartment of a motor vehicle for the operation of windows and other closures, and to this end the unit will now be described in connection with a sliding window as an illustration of one of its uses.

Referring more particularly to the drawings, the numeral 1 designates the right hand door of a motor vehicle having the vertical channel guides 2 slidably receiving the window panel or pane 3 for opening and closing adjustment. The panel has depending brackets 4 with slots 5 in which fasteners 6 engage to adjustably connect it to the cross arm 7 of a vertical carrier or slide 8. Slots 9 are provided in the cross arm at right angles to the slots 5 and are disposed to cross the same for receiving the fasteners in facilitating the connection.

The improved transmission unit, when used in a window adjusting arrangement constitutes a flexible support for the panel and is preferably guided in its vertical panel-adjusting movement by a stanchion 10 shown as being C-shape in cross section. This upright support may be rockably mounted by a pin or bolt 11 upon a sill bracket plate 12 suitably secured within the window-receiving well of the door, such as on the inside wall 13. The panel carrying member may be slidably mounted on the stanchion by a pair of vertically spaced studs 14 having rollers 15 which are retained in place by overhanging flanges 10'. This arrangement provides a sturdy support for the window that will enable the panel to readily follow its fixed guiding channels 2 while permitting the stanchion to yield laterally about its rocking axis in accommodation of any irregularity either in the assembly of the parts or in its installation.

A power driven actuator 16 is provided to raise and lower the carrier slide and therethrough to make the desired window adjustment. This actuator is mounted to have a path of movement substantially parallel to that of the window carrier. While the actuator may be powered either electrically or hydraulically, it is herein illustrated as being operated by a pneumatic motor which is operable economically from the intake manifold 18 of the internal combustion engine of the vehicle, as a source of suction, with or without an auxiliary source in the form of a rotary pump 19. Such pump may be driven by a small electric motor 20 which is connected in circuit with a source of electric energy 21 through a suction responsive switch 22, all as is more fully disclosed in an earlier Patent No. 2,520,650. The pneumatic motor, which may be considered a part of the actuator, comprises a cylinder 23 and a piston 24 and this construction may follow that of another earlier Patent No. 2,515,712 wherein a self-locking piston serves to lock the window against being opened unauthorizedly. For increased motive power, twin motors 23, 24 may be used with their piston rods 25 connected to the opposite ends of the actuator to provide a balanced structure. The twin motors are mounted on a clevis bracket 26 which is clamped to the sill bracket 12 beneath the stanchion by the bolt 11. The upper ends of the two cylinders 23 are joined by a tie plate 27 which embraces the upstanding stanchion for reinforcement. Consequently, any angular adjustment of the stanchion, during its process of installation, will cause the power unit to follow.

A motion multiplying and movement extending transmission is interposed between the actuator 16 and the window carrier 8. This transmission comprises two flexible linear pull-elements herein shown as a carrier-lifting cable 28 and a carrier-lowering cable 29 each anchored to a respective end of the carrier. For this purpose the upper and lower ends of the slide are turned outwardly to form anchor lugs 8' each formed with an eye to receive an anchoring head 30 fixed to the end of the particular cable. The opposite ends of the two cables are anchored at 31 to the adjacent ends of the stanchion, or to fixedly related parts such as the cap 32 and the clevis bracket plate 26. Intermediate their anchored ends, the two cables take about a pulling part on the actuator, such as the pulley 33, from opposite directions and in effect form active loops each seating in a respective peripheral groove 34. Separate pulleys may be provided for the two pull loops. The arrangement is such that when the actuator 16 is driven upwardly, the pulley 33 will lift on the cable loop 28 and in so doing will rotate clockwise to pay out the cable toward its fixed end 31 and to take in cable from its carrier connected end 30 thereby lifting the carrier to its closed window position of Fig. 7. By reason of the motion advantage gained through the pulley and cable the imparted lift of the carrier will be twice as great as the movement of the actuator. During this lifting action the companion cable 29 will idle. However, a reverse movement of the actuator, to lower or open the window, will exert a downward pull upon the cable loop 29 and lower the window carrier rapidly to the open-window position of Fig. 6, during which descent the window lifting or closing cable idles. To preserve the loop-formations of the cable, the path of the vertical movement of the actuator overlaps the carrier but obviously is shorter in extent.

To maintain the cables taut, a coiled spring 35 is inserted in the cable 29, or in its anchorage, with a stretch-arresting link 36 serving to positively limit the extent of yield of the spring. This absorbs unnecessary slack in both cables.

Suitable means may be provided for setting the window system in operation, such as the valve 37, by which an operating pressure differential will act upon the motor pistons 24 concurrently. For this reason the suction conduits 38 have branches 39 leading off to the corresponding ends of the two cylinders. A counterbalance spring 40 may be employed for offsetting the effect of the weight of the window upon the motor, the spring acting through pivotally connected links 41 and 42 that may have their outer ends respectively pivoted at 16' to the actuator 16 and to a fixed part on the motor, such as at 43' on the flange 43 of the tie plate 27.

To open or close the window, it is only necessary to move the control valve 37 in one direction or the other. Normally, the opposite ends of the motor chambers 23 are in open communication with the source of suction so that when the valve is actuated it will open one end to the outside atmospheric pressure for a quicker response. The pressure differential will energize the motor to move the piston and its connected actuator for exerting a pull on the corresponding loop to actuate the carrier slide.

The action is simple and quick, the active one of the two cables winding onto the pulley at one side and unwinding therefrom at the opposite side. The multiplying action of the transmission permits the use of shorter motor cylinders for utmost compactness when the window operator is in its collapsed state. The extensible transmission is flexible in nature by reason of which the motive power is transmitted to the window carrier through a pull on a selected cable. This will enable a self adjustment and equalization of forces to move the window panel through its fixed channeled guides without imposing binding pressures thereupon which may obstruct free sliding movement to and from a closed position. The upper end of the stanchion may if desired, be supported from the door wall 13 through a play connection which will permit the self-adjustment action aforesaid.

Each cable has one end portion fixed to the stanchion 10 and its opposite end portion to the carrier or slide 8. When taken individually each cable may be considered as comprising two sections, one an anchored section on which the rotatable member 33 has rolling contact and a driven section which in turn is secured to the respective end of the slide carrier. As the actuator causes the pulley to roll up on the anchored section of cable 28, such pulley will lift on the carrier anchored section of the cable to lift the carrier, and on the reverse stroke the two sections of the cable 29 will function in a similar manner to roll the slide carrier. As one section of each cable winds onto the journaled member 33 the other section will unwind. It is obvious that one cable serves to return the slide carrier from the position to which it has been carried by the companion cable.

The actuator 16 and the connected transmission may be reciprocated by power units other than the suction operated unit herein depicted. In the present illustrated embodiment the actuator has a path of movement extending substantially parallel to that of the carrier 8, but at less speed, and is constrained to or guided in such path by the piston rods 25 and the counterbalancing linkage 41, 42. The driven cross arm 7 is connected to the upper end of the carrier by a U-shaped bracket 7' which straddles the upper end of the stanchion for additional guidance and reinforcement.

In lieu of multiplying the motion, the transmission could be used in reversal to obtain a motion reducing action by applying the motive force to the member 7 and have the member 16 serve as the driven one.

The foregoing description has been given in detail without thought of limitation since the inventive principles involved are capable of assuming other physical embodiments without departing from the spirit of the invention and the scope of the appended claims.

What is claimed is:

1. A window operator comprising, in combination with a slidable window, a window adjusting slide having anchor lugs on its lower and upper ends on one side and spaced rollers on the opposite side, a support having a longitudinal channel in which the rollers are received for guiding the slide in vertical movement in window adjustment, an actuator for said slide guided for vertical movement, said actuator having a pulley mounted thereon, a transmission interposed between and operatively connecting the slide to the actuator, a window-carrying cross arm connected to the slide in sliding embrace with the upper end of the support and a motor for actuating said actuator, said transmission including two flexible linear pull elements, each one connected to one end of the slide and each pull element looping about the pulley and having their opposite ends connected respectively to the end of the support and to the adjacent anchor lug on said slide.

2. The invention as claimed in claim 1 wherein the longitudinal channel is C-shaped in cross section.

3. The invention as claimed in claim 1 wherein a spring is attached to the pull element and to the lug to keep the pull element taut.

4. The invention as claimed in claim 1 wherein the motor for actuating the actuator comprises two motors positioned on opposite sides of the support and operating together to operate the actuator.

References Cited in the file of this patent

UNITED STATES PATENTS

| | | |
|---|---|---|
| 1,659,587 | Basco | Feb. 21, 1928 |
| 1,754,873 | Blackwood | Apr. 15, 1930 |
| 1,816,258 | Lake | July 28, 1931 |
| 1,844,873 | Smith | Feb. 9, 1932 |
| 2,089,700 | Kidder | Aug. 10, 1937 |
| 2,205,103 | Mahnken | June 18, 1940 |
| 2,391,073 | Rappl | Dec. 18, 1945 |
| 2,400,572 | Parsons | May 21, 1946 |
| 2,530,577 | Gurries | Nov. 21, 1950 |
| 2,555,710 | Simpkins et al. | June 5, 1951 |
| 2,633,353 | Meek | Mar. 31, 1953 |